United States Patent
Candelore et al.

(10) Patent No.: US 10,650,702 B2
(45) Date of Patent: *May 12, 2020

(54) MODIFYING DISPLAY REGION FOR PEOPLE WITH LOSS OF PERIPHERAL VISION

(71) Applicant: Sony Corporation, Tokyo (JP)

(72) Inventors: Brant Candelore, Escondido, CA (US); Mahyar Nejat, San Diego, CA (US); Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,617

(22) Filed: Jul. 10, 2017

(65) Prior Publication Data

US 2019/0012931 A1   Jan. 10, 2019

(51) Int. Cl.
*G09B 21/00* (2006.01)
*H04N 5/262* (2006.01)
(Continued)

(52) U.S. Cl.
CPC .......... *G09B 21/008* (2013.01); *G06F 3/0488* (2013.01); *G06T 7/11* (2017.01);
(Continued)

(58) Field of Classification Search
CPC ... G09B 21/008; H04N 13/117; G06K 9/3233
See application file for complete search history.

(56) References Cited

U.S. PATENT DOCUMENTS

| 6,195,640 B1 | 2/2001 | Mullaly et al. |
| 6,948,136 B2 | 9/2005 | Trewin |

(Continued)

FOREIGN PATENT DOCUMENTS

| EP | 0701366 A2 | 3/1996 |
| JP | 3037041 B2 | 4/2000 |

(Continued)

OTHER PUBLICATIONS

Peter Shintani, Brant Candelore, Mahyar Nejat, "Moving Audio from Center Speaker to Peripheral Speaker of Display Device for Macular Degeneration Accessibility", related U.S. Appl. No. 15/646,550, Final Office Action dated Jan. 25, 2018.

(Continued)

*Primary Examiner* — Rebecca A Volentine
(74) *Attorney, Agent, or Firm* — John L. Rogitz (57) ABSTRACT

The most active part of a video frame is magnified on a display to accommodate people with eye maladies such as glaucoma or perhaps retinitis pigmentosa. An area of interest in a video frame is identified, and that area is expanded or magnified to the center of the display, where people suffering from loss of peripheral vision can best see. Assuming the viewer sits a benchmark distance from the display, the active part of the image is expanded to fit in what can be seen in the center of the display without moving the head left to right and up and down. This may be done by the display recognizing where most of the action is taking place by means of with motion vectors and I-macroblocks, or by allowing the viewer to switch to various predetermined blocks on screen using a remote control.

21 Claims, 7 Drawing Sheets

(51) Int. Cl.
*G06T 7/11* (2017.01)
*G06F 3/0488* (2013.01)
*H04N 21/485* (2011.01)
*H04N 21/435* (2011.01)
*H04N 21/442* (2011.01)
*H04N 21/4402* (2011.01)
*H04N 21/44* (2011.01)
*H04N 21/45* (2011.01)

(52) U.S. Cl.
CPC ....... *H04N 5/2628* (2013.01); *H04N 21/4355* (2013.01); *H04N 21/44008* (2013.01); *H04N 21/44218* (2013.01); *H04N 21/440245* (2013.01); *H04N 21/4532* (2013.01); *H04N 21/4858* (2013.01)

(56) References Cited

U.S. PATENT DOCUMENTS

| | | |
|---|---|---|
| 7,110,951 B1 | 9/2006 | Pedersem et al. |
| 8,213,916 B1 | 7/2012 | Yankovich et al. |
| 8,494,298 B2 | 7/2013 | Lewis et al. |
| 8,965,216 B2 | 2/2015 | Oshima et al. |
| 8,965,546 B2 | 2/2015 | Visser et al. |
| 9,055,265 B2 | 6/2015 | Shintani et al. |
| 9,124,685 B2 | 9/2015 | Kulas |
| 9,137,484 B2 | 9/2015 | Difrancesco et al. |
| 9,180,053 B2 | 11/2015 | Dalal et al. |
| 9,191,767 B2 | 11/2015 | Hopkins |
| 9,196,239 B1 | 11/2015 | Taylor et al. |
| 9,197,925 B2 | 11/2015 | Alberth et al. |
| 9,241,620 B1 * | 1/2016 | Kockan ............... A61B 3/0033 |
| 9,257,114 B2 | 2/2016 | Tanaka |
| 9,263,027 B2 | 2/2016 | Hopkins et al. |
| 9,489,928 B2 | 11/2016 | Andrysco et al. |
| 9,542,027 B2 | 1/2017 | Fan et al. |
| 9,596,555 B2 | 3/2017 | Kaburlasos et al. |
| 9,692,776 B2 | 6/2017 | Savant |
| 10,242,501 B1 | 3/2019 | Pusch et al. |
| 2003/0030752 A1 | 2/2003 | Begeja et al. |
| 2003/0227406 A1 | 12/2003 | Armstrong |
| 2004/0246272 A1 | 12/2004 | Ramian |
| 2005/0047624 A1 | 3/2005 | Kleen |
| 2006/0109242 A1 | 5/2006 | Simpkins |
| 2006/0125796 A1 | 6/2006 | Utz et al. |
| 2006/0140420 A1 | 6/2006 | Machida |
| 2006/0280364 A1 * | 12/2006 | Ma ..................... G06K 9/00456 |
| | | 382/173 |
| 2007/0109324 A1 | 5/2007 | Lin |
| 2008/0112614 A1 * | 5/2008 | Fluck .................. G06K 9/3233 |
| | | 382/168 |
| 2008/0159406 A1 | 7/2008 | Chujoh et al. |
| 2008/0291265 A1 * | 11/2008 | Wagner .................. H04N 7/152 |
| | | 348/14.16 |
| 2009/0313582 A1 | 12/2009 | Rupsingh et al. |
| 2010/0131983 A1 | 5/2010 | Shannon et al. |
| 2010/0235745 A1 | 9/2010 | Shintani |
| 2010/0309147 A1 | 12/2010 | Fleizach et al. |
| 2011/0035031 A1 | 2/2011 | Faenger et al. |
| 2011/0043644 A1 * | 2/2011 | Munger ............... G02B 27/017 |
| | | 348/207.1 |
| 2011/0185313 A1 | 7/2011 | Harpaz et al. |
| 2012/0167154 A1 | 6/2012 | Kim et al. |
| 2012/0275701 A1 * | 11/2012 | Park ..................... G06K 9/4671 |
| | | 382/173 |
| 2012/0324493 A1 | 12/2012 | Holmdahl et al. |
| 2013/0121515 A1 | 5/2013 | Hooley et al. |
| 2013/0133022 A1 | 5/2013 | Bi et al. |
| 2013/0230099 A1 | 9/2013 | Deforest et al. |
| 2014/0196129 A1 | 7/2014 | Amin |
| 2014/0254828 A1 | 9/2014 | Ray et al. |
| 2014/0267284 A1 * | 9/2014 | Blanche ................ G09G 3/003 |
| | | 345/428 |
| 2014/0287779 A1 | 9/2014 | O'Keefe et al. |
| 2014/0314261 A1 | 10/2014 | Selig et al. |
| 2014/0356848 A1 * | 12/2014 | Peterson ............... G06F 3/0482 |
| | | 434/428 |
| 2015/0026587 A1 | 1/2015 | Ollivierre et al. |
| 2015/0036999 A1 | 2/2015 | Batur et al. |
| 2015/0045003 A1 | 2/2015 | Vora et al. |
| 2015/0103154 A1 * | 4/2015 | Candelore .......... H04N 21/4852 |
| | | 348/63 |
| 2015/0130703 A1 | 5/2015 | Ghajar |
| 2015/0153912 A1 | 6/2015 | Reily et al. |
| 2015/0289124 A1 | 10/2015 | Palin et al. |
| 2015/0301338 A1 | 10/2015 | Heugten |
| 2015/0309709 A1 | 10/2015 | Kulkarni et al. |
| 2015/0373295 A1 | 12/2015 | Outters |
| 2016/0014540 A1 | 1/2016 | Kelly et al. |
| 2016/0021481 A1 | 1/2016 | Johnson et al. |
| 2016/0063894 A1 | 3/2016 | Lee |
| 2016/0078594 A1 | 3/2016 | Scherlen |
| 2016/0166204 A1 | 6/2016 | Stevens et al. |
| 2016/0170617 A1 | 6/2016 | Shi et al. |
| 2016/0198941 A1 * | 7/2016 | Aguilar ................ G09B 21/008 |
| | | 351/205 |
| 2016/0239253 A1 | 8/2016 | Staffaroni et al. |
| 2016/0282624 A1 | 9/2016 | Munger et al. |
| 2016/0320935 A1 * | 11/2016 | Shin ...................... G06F 3/0484 |
| 2016/0334977 A1 | 11/2016 | Zaitsev et al. |
| 2017/0165573 A1 | 6/2017 | Froy et al. |
| 2017/0265016 A1 | 9/2017 | Oh et al. |
| 2017/0360295 A1 * | 12/2017 | Oz ......................... A61B 3/113 |
| 2018/0001198 A1 | 1/2018 | Frappiea |
| 2018/0064330 A1 * | 3/2018 | Markus ................ A61B 3/0075 |
| 2018/0122254 A1 | 5/2018 | Rangan et al. |
| 2018/0125716 A1 * | 5/2018 | Cho .................... G02B 27/017 |
| 2018/0129518 A1 * | 5/2018 | Lee ......................... G06F 9/451 |
| 2018/0158385 A1 | 6/2018 | Reichow et al. |
| 2018/0173505 A1 | 6/2018 | Yan |

FOREIGN PATENT DOCUMENTS

| | | |
|---|---|---|
| JP | 2008236299 A | 10/2008 |
| KR | 100260702 B1 | 7/2000 |

OTHER PUBLICATIONS

Peter Shintani, Brant Candelore, Mahyar Nejat, "Moving Audio from Center Speaker to Peripheral Speaker of Display Device for Macular Degeneration Accessibility", related U.S. Appl. No. 15/646,550, Applicant's response to Final Office Action filed Jan. 26, 2018.

Peter Shintani, Brant Candelore, Mahyar Nejat, "Moving Audio from Center Speaker to Peripheral Speaker of Display Device for Macular Degeneration Accessibility", related U.S. Appl. No. 15/646,550, Non-Final Office Action dated Feb. 9, 2018.

Peter Shintani, Brant Candelore, Mahyar Nejat, "Moving Audio from Center Speaker to Peripheral Speaker of Display Device for Macular Degeneration Accessibility", related U.S. Appl. No. 15/646,550, Applicant's response to Non-Final Office Action filed Feb. 14, 2018.

Peter Shintani, Brant Candelore, Mahyar Nejat, "Sensing Viewer Direction of Viewing to Invoke Accessibility Menu in Audio Video Device", file history of related U.S. Appl. No. 15/646,661, filed Jul. 11, 2017.

Gregory Carlsson, Steven Richman, James R. Milne, "Accessibility for the Hearing Impaired Using Measurement and Object Based Audio", file history of related U.S. Appl. No. 15/590,795, filed May 9, 2017.

Peter Shintani, Brant Candelore, Mahyar Nejat, "Quick Accessibility Profiles", file history of related U.S. Appl. No. 15/646,986, filed Jul. 11, 2017.

Peter Shintani, Brant Candelore, Mahyar Nejat, "Moving Audio from Center Speaker to Peripheral Speaker of Display Device for Macular Degeneration Accessibility", file history of related U.S. Appl. No. 15/646,550, filed Jul. 11, 2017.

Carlos Aguilar, Eric Castet, "Evaluation of a gaze-controlled vision enhancement system for reading in visually impaired people", Nice Sophia Antipolis University, Aix Marseille University, Apr. 5, 2017, Nice, France, Marseille, France.

(56) References Cited

OTHER PUBLICATIONS

James Ohene-Djan, Rachel Shipsey, "E-Subtitles: Emotional Subtitles as a Technology to assist the Deaf and Hearing-Impaired when Learning from Television and Film.". Goldsmiths College, University of London, 2006, New Cross, London.
John L. Sibert, Mehmet Gokturk, Robert A. Lavine, "The Reading Assistant: Eye Gaze Triggered Auditory Prompting for Reading Remediation", George Washington University, 2000.
Kickstarter, "Nura: Headphones that learn and adapt to your unique hearing", launch date May 16, 2016, website: https://www.kickstarter.com/projects/nura/nura-headphones-that-learn-and-adapt-to-your-unique-hearing.
Rita Oliveira, Jorge Ferraz De Abreu, Ana Margarida Almeida, "Audio Description in Interactive Television (iTV): proposal of a collaborative and voluntary approach", Department of Communication and Arts, University of Aveiro, Sep. 2016, Aveiro, Portugal.
Robert Silva, "The ZVOX AV200 AccuVoice TV Speaker Makes Voices and Dialog Clear", Dec. 20, 2016 https://www.lifewire.com/the-zvox-av200-accuvoice-tv-speaker-makes-voices-and-dialog-clear-4086538?utm_source=emailshare&utm_medium=social&utm_campaign=shareurlbuttons.
Peter Shintani, Brant Candelore, Mahyar Nejat, "Moving Audio From Center Speaker to Peripheral Speaker of Display Device for Macular Degeneration Accessibility", related U.S. Appl. No. 15/646,550, Non-Final Office Action dated Jul. 17, 2018.
Peter Shintani, Brant Candelore, Mahyar Nejat, "Moving Audio From Center Speaker to Peripheral Speaker of Display Device for Macular Degeneration Accessibility", related U.S. Appl. No. 15/646,550, Applicant's response to Non-Final Office Action filed Jul. 20, 2018.
Anabel Martin Gonzalez, "Advanced Imaging in Head-Mounted Displays for Patients with Age-Related Macular Degeneration", Dissertation, Technical University of Munich, Jun. 29, 2011 (pp. No. 1-149).
Robert B. Goldstein, Henry Apfelbaum, Gang Luo and Eli Peli "Dynamic Magnification of Video for People with Visual Impairment", May 2003, The Schepens Eye Research Institute, Harvard Medical School, Boston, MA, USA.
Brant Candelore, Mahyar Nejat, Peter Shintani, "Modifying Display Region for People With Vision Impairment", file history of related U.S. Appl. No. 15/631,669, filed Jun. 23, 2017.
Brant Candelore, Mahyar Nejat, Peter Shintani, "Modifying Display Region for People With Macular Degeneration", file history of related U.S. Appl. No. 15/645,796, filed Jul. 10, 2017.
Brant Candelore, Mahyar Nejat, Peter Shintani, "Modifying Display Region for People with Vision Impairment", Applicants response to non-final office action filed Oct. 11, 2018 in related pending U.S. Appl. No. 15/631,669.
Brant Candelore, Mahyar Nejat, Peter Shintani, "Modifying Display Region for People with Macular Degeneration", related U.S. Appl. No. 15/645,796, Non-Final Office Action dated Sep. 21, 2018.
Brant Candelore, Mahyar Nejat, Peter Shintani, "Modifying Display Region for People with Macular Degeneration", related U.S. Appl. No. 15/645,796, Applicant's response to Non-Final Office Action filed Sep. 24, 2018.
Brant Candelore, Mahyar Nejat, Peter Shintani, "Modifying Display Region for People With Vision Impairment", related U.S. Appl. No. 15/631,669, Non-Final Office Action dated Oct. 5, 2018.
Brant Candelore, Mahyar Nejat, Peter Shintani, "Modifying Display Region for People with Macular Degeneration", related U.S. Appl. No. 15/645,796, Final Office Action dated Nov. 7, 2018.
Brant Candelore, Mahyar Nejat, Peter Shintani, "Modifying Display Region for People with Macular Degeneration", related U.S. Appl. No. 15/645,796, Applicant's response to Final Office Action filed Nov. 8, 2018.
Brant Candelore, Mahyar Nejat, Peter Shintani, "Modifying Display Region for People with Vision Impairment", related U.S. Appl. No. 15/631,669, Final Office Action dated Jan. 2, 2019.
Brant Candelore, Mahyar Nejat, Peter Shintani, "Modifying Display Region for People with Vision Impairment", related U.S. Appl. No. 15/631,669, Applicants response to Final Office Action filed Jan. 4, 2019.
Peter Shintani, Brant Candelore, Mahyar Nejat, "Moving Audio from Center Speaker to Peripheral Speaker of Display Device for Macular Degeneration Accessibility", related U.S. Appl. No. 15/646,550, Final Office Action dated Feb. 7, 2019.
Peter Shintani, Brant Candelore, Mahyar Nejat, "Moving Audio from Center Speaker to Peripheral Speaker of Display Device for Macular Degeneration Accessibility", related U.S. Appl. No. 15/646,550, Applicant's response to Final Office Action filed Feb. 12, 2019.
Peter Shintani, Brant Candelore, Mahyar Nejat, "Moving Audio from Center Speaker to Peripheral Speaker of Display Device for Macular Degeneration Accessibility", Final Office Action dated Dec. 13, 2018.
Peter Shintani, Brant Candelore, Mahyar Nejat, "Moving Audio from Center Speaker to Peripheral Speaker of Display Device for Macular Degeneration Accessibility", Applicants response to Final Office Action filed Dec. 17, 2018.
Brant Candelore, Mahyar Nejat, Peter Shintani, "Modifying Display Region for People with Vision Impairment", related U.S. Appl. No. 15/631,669, Non-Final Office Action dated Mar. 7, 2019.
Brant Candelore, Mahyar Nejat, Peter Shintani, "Modifying Display Region for People with Vision Impairment", related U.S. Appl. No. 15/631,669, Applicants response to Non-Final Office Action filed Mar. 12, 2019.
Brant Candelore, Mahyar Nejat, Peter Shintani, "Modifying Display Region for People with Vision Impairment", related U.S. Appl. No. 15/631,669, Final Office Action dated May 1, 2019.
Brant Candelore, Mahyar Nejat, Peter Shintani, "Modifying Display Region for People with Vision Impairment", related U.S. Appl. No. 15/631,669, Applicant's response to Final Office Action filed May 6, 2019.
Brant Candelore, Mahyar Nejat, Peter Shintani, "Modifying Display Region for People with Macular Degeneration", related U.S. Appl. No. 15/645,796, Non-Final Office Action dated Jun. 7, 2019.
Brant Candelore, Mahyar Nejat, Peter Shintani, "Modifying Display Region for People with Macular Degeneration", related U.S. Appl. No. 15/645,796, Applicant's response to Non-Final Office Action dated filed Jun. 12, 2019.
Brant Candelore, Mahyar Nejat, Peter Shintani, "Modifying Display Region for People with Vision Impairment", related U.S. Appl. No. 15/631,669, Non-Final Office Action dated Jun. 14, 2019.
Brant Candelore, Mahyar Nejat, Peter Shintani, "Modifying Display Region for People with Vision Impairment", related U.S. Appl. No. 15/631,669, Applicant's response to Non-Final Office Action filed Jun. 19, 2019.
Peter Shintani, Brant Candelore, Mahyar Nejat, "Sensing Viewer Direction of Viewing to Invoke Accessibility Menu in Audio Video Device", related U.S. Appl. No. 15/646,661, Non-Final Office Action dated Jul. 1, 2019.
Peter Shintani, Brant Candelore, Mahyar Nejat, "Sensing Viewer Direction of Viewing to Invoke Accessibility Menu in Audio Video Device", related U.S. Appl. No. 15/646,661, Applicant's response to Non-Final Office Action filed Jul. 15, 2019.
Peter Shintani, Brant Candelore, Mahyar Nejat, "Sensing Viewer Direction of Viewing to Invoke Accessibility Menu in Audio Video Device", related U.S. Appl. No. 15/646,661, Non-Final Office Action dated Nov. 18, 2019.
Peter Shintani, Brant Candelore, Mahyar Nejat, "Sensing Viewer Direction of Viewing to Invoke Accessibility Menu in Audio Video Device", related U.S. Appl. No. 15/646,661, Applicant's response to Non-Final Office Action filed Nov. 26, 2019.
Candelore et al., "Modifying Display Region for People with Vision Impairment", related U.S. Appl. No. 15/631,669, Final Office Action dated Sep. 5, 2019.
Candelore et al., "Modifying Display Region for People with Macular Degeneration", related U.S. Appl. No. 15/645,796, Final Office Action dated Jul. 29, 2019.
Candelore et al., "Modifying Display Region for People with Macular Degeneration", related U.S. Appl. No. 15/645,796, Applicant's response to Final Office Action filed Aug. 6, 2019.

(56) References Cited

OTHER PUBLICATIONS

Shintani et al., "Sensing Viewer Direction of Viewing to Invoke Accessibility Menu in Audio Video Device", related U.S. Appl. No. 15/646,661, Applicants's response to Final Office Action filed Aug. 13, 2019.

Shintani et al., "Sensing Viewer Direction of Viewing to Invoke Accessibility Menu in Audio Video Device", related U.S. Appl. No. 15/646,661, Final Office Action dated Aug. 9, 2019.

\* cited by examiner

FIG. 3  Identifying sweet spot (1)

FIG. 4  Identifying sweet spot (2)

FIG. 5  Identifying sweet spot (3)

FIG. 6    Identifying sweet spot (4)

FIG. 7    Identifying video elements of interest

FIG. 8

FIG. 9    Identifying video elements in demanded image

Before

FIG. 10

After

FIG. 11

Before

FIG. 12

After

MODIFYING DISPLAY REGION FOR PEOPLE WITH LOSS OF PERIPHERAL VISION

FIELD

The present application relates to technically inventive, non-routine solutions that are necessarily rooted in computer technology and that produce concrete technical improvements.

BACKGROUND

Visual impairments include maladies that cause loss of peripheral vision, such as glaucoma or occasionally retinitis pigmentosa, and maladies that cause loss of vision in the center of view, such as macular degeneration. People suffering from such impairments can experience difficulty viewing a video screen such as a TV because they must move their heads to see the entire video frame.

SUMMARY

Present principles recognize the above problems experienced by visually impaired people and so an area of interest in a video frame is identified, such as a person speaking, a moving object such as a vehicle coming up a valley, etc. This area of interest is expanded or magnified in the center of the display (for people having peripheral vision impairment) or at the periphery of the display (for people with macular degeneration). In other words, the most interesting or active part of the video is presented in the region of the display where people suffering from a particular eye malady can best see. Assuming a viewer with loss of peripheral vision, for example, sits a benchmark distance from the display, the active part of the image is expanded to fit in what can be seen in the center of the display without moving the head left to right and up and down. This may be done by the display recognizing where most of the action is taking place by means of with motion vectors and I-macroblocks, or by allowing the viewer to switch to various predetermined blocks on screen using a remote control.

Accordingly, a device includes at least one computer memory that is not a transitory signal and that in turn includes instructions executable by at least one processor to identify at least one preferred region of a video display having plural regions, including at least one non-preferred region. The instructions are executable to receive identification of at least one video item of interest (VII) and to identify, in at least one video frame for presentation on the video display, the VII in a frame location corresponding to the non-preferred region of the video display. The instructions also are executable to present the VII in the preferred region of the video display.

In example embodiments, the instructions may be executable to enlarge the VII relative to a size of the VII received in the video frame to render an enlarged VII which is presented in the preferred region in lieu of presenting the VII received in the video frame in the non-preferred region.

In some examples, the instructions are executable to identify the preferred region of a video display at least in part by receiving an image of a viewer, executing image recognition on the image to render a result, and using the result to access a database having information useful in identifying the preferred region based on the result of the image recognition. In other example, the instructions are executable to identify the preferred region of a video display at least in part by receiving input from at least one user interface (UI) indicating a type of visual impairment, and correlating the type of visual impairment to the preferred region. Yet again, in some examples the instructions are executable to identify the preferred region of a video display at least in part by receiving input from at least one user interface (UI) indicating, by a selection on a region of the display, the preferred region. Still further, in come implementations the instructions are executable to identify the preferred region of a video display at least in part by sending to at least one server at least one identification (ID). The ID includes an ID of the video display and/or an ID of a person. The instructions are executable for receiving back from the server indication of the preferred region responsive to the ID.

Turning to the identification of a VII, in example non-limiting embodiments the instructions are executable to receive the identification of the VII at least in part by accessing a data store of default VII. In addition, or alternatively, the instructions can be executable to receive the identification of the VII at least in part by receiving input from at least one user interface (UI) indicating at least one VII.

In non-limiting implementations, the instructions are executable to identify, in at least one video frame for presentation on the video display, the VII at least in part by selecting a portion of a video frame as the VII responsive to the portion being characterized by one or more motion vectors satisfying a first test. In addition, or alternatively, the instructions can be executable to identify, in at least one video frame for presentation on the video display, the VII at least in part by executing image recognition on at least one video frame to identify a VII. Yet again, the instructions may be executable to identify, in at least one video frame for presentation on the video display, the VII at least in part by selecting a portion of a video frame as the VII responsive to the portion being characterized by one or more histograms satisfying a first test.

In a current example, the preferred region is at a center of the video display. In example embodiments, the preferred region does not include a peripheral region of the video display.

In another aspect, a method includes identifying that a viewer of a video display has a peripheral visual impairment, and responsive to identifying that the viewer of the video display has a peripheral visual impairment, presenting, in a central region of the video display, an item of interest received in a peripheral region of a video frame.

In another aspect, a system includes a video display, a processor to control the video display, and storage with instructions accessible to the processor to cause the processor to receive indication that a video item of interest received in a peripheral region in a video frame is to be presented in a central region of the video display. The instructions are executable to, responsive to identifying the video item of interest in a peripheral region in a video frame, present the video item of interest (VII) in the central region of the video display.

The details of the present disclosure, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer.

The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Figure 1:
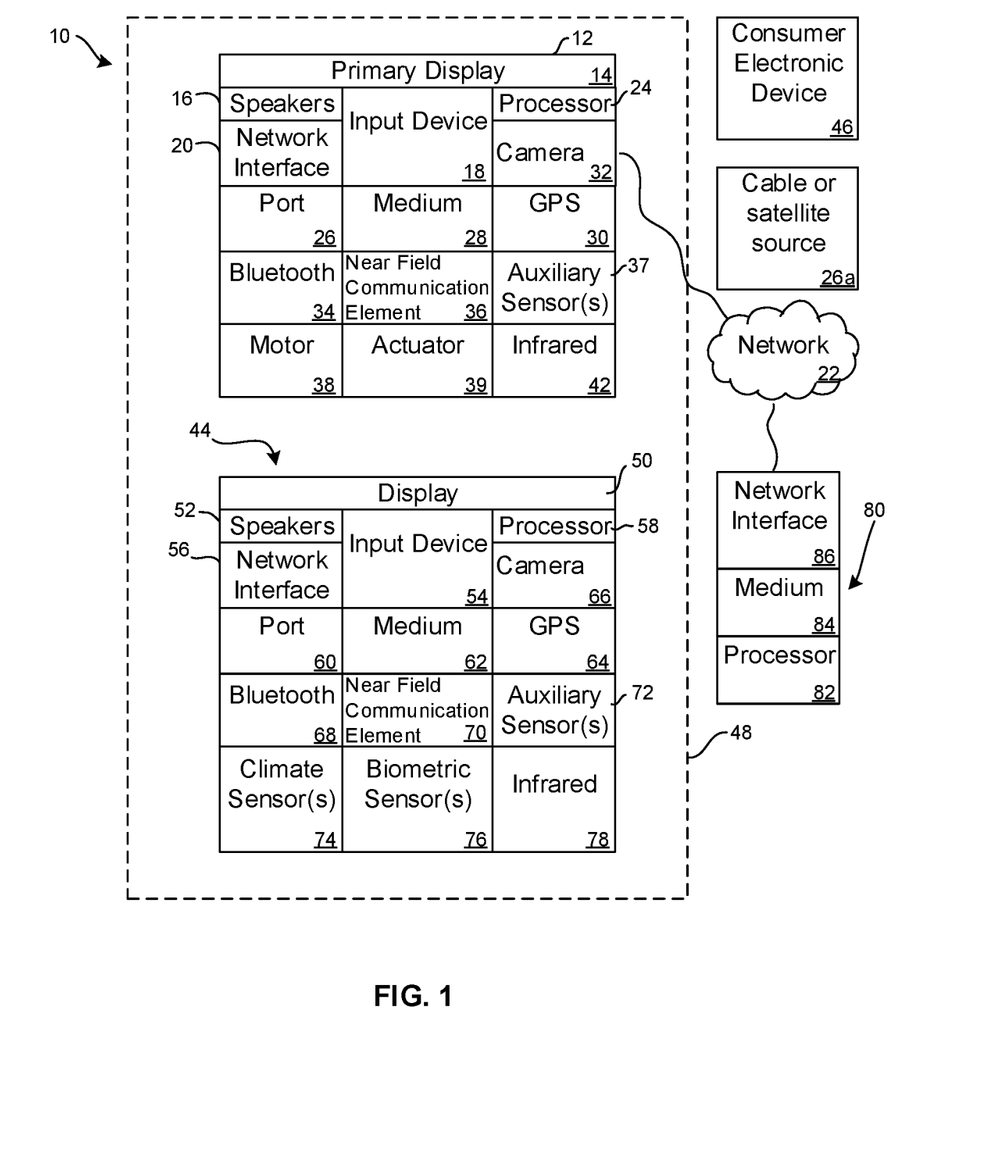
FIG. 1 is a block diagram of an example system including an example consistent with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
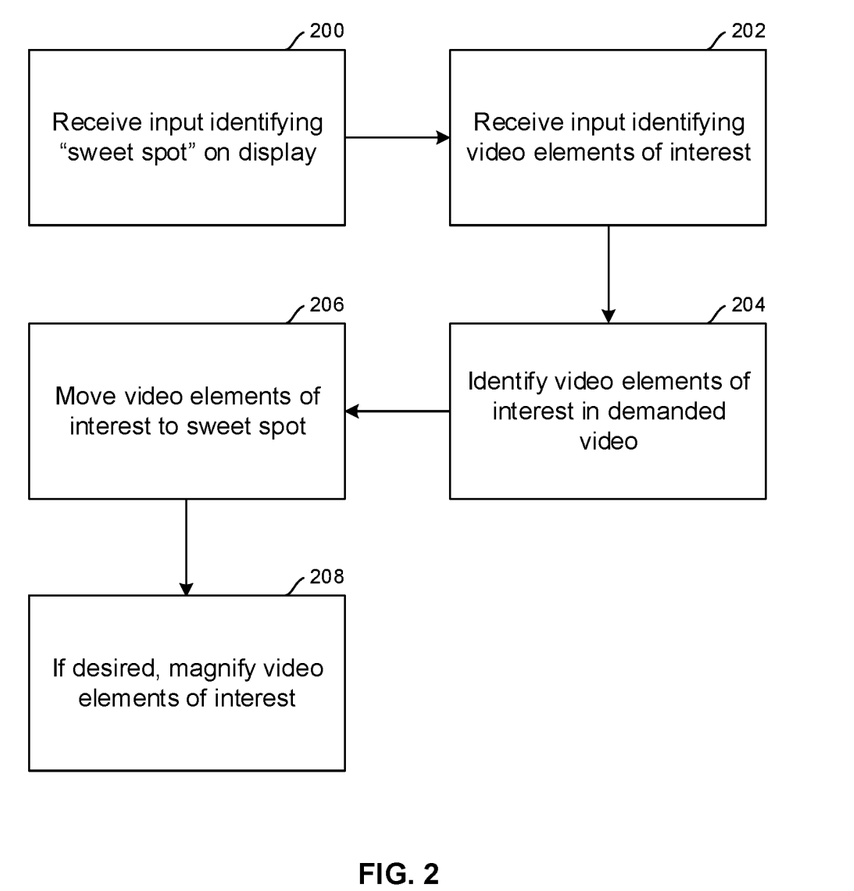
FIG. 2 is a flow chart of example overall logic consistent with present principles.

FIG. 2 shows an example overall logic flow. Commencing at block 200, input is received indicating a "sweet spot" on the display 14. The "sweet spot" is an area of the display less than the total display area and may be determined as further described below.

Moving to block 202, input is received identifying video elements or items of interest, described further below. Then, when video is selected for play, at block 204 video elements or items of interest are identified in the video and at block 206 moved to the "sweet spot" in video frame identified at block 200. If desired, the relocated video items of interest may be magnified or otherwise enlarged at block 208 to be a greater size than the size they had when originally received. Magnification may be accomplished by adding extrapolated pixels between pixels of the originally-sized video object of interest 500 or by other suitable means.

Figure 3:
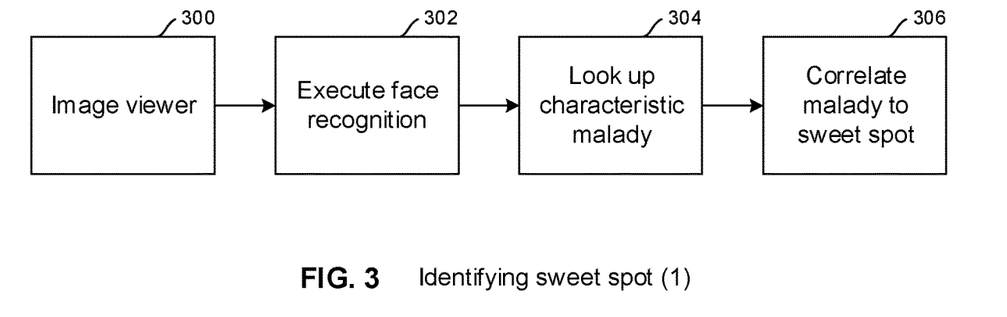
FIG. 3 is a flow chart of example logic for identifying the display "sweet spot" for the visually-impaired viewer, according to a first embodiment.

FIG. 3 illustrates a first embodiment for identifying the sweet spot at block 200. At block 300 a viewer of the AVDD 12 is imaged using, e.g., the camera 32. Image recognition may be executed on the image at block 302 by the AVDD processor 24 or, if desired, the image may be offloaded to the CE device 44 or to the server 80 and image recognition executed there. At block 304 the AVDD processor or the server or other processor executing image recognition can look up, based on the image, a malady characteristic of the image, which is correlated to the sweet spot at block 306.

For example, if image recognition indicates that the viewer constantly has his or her head cocked to one side, with the periphery of the eyes turned directly toward the AVDD, that image may be correlated to "macular degeneration". On the other hand, if a series of images reveals that the user is constantly turning his or her head right and left in a constant or near-constant swivel motion, that set of images may be correlated to glaucoma.

Figure 4:
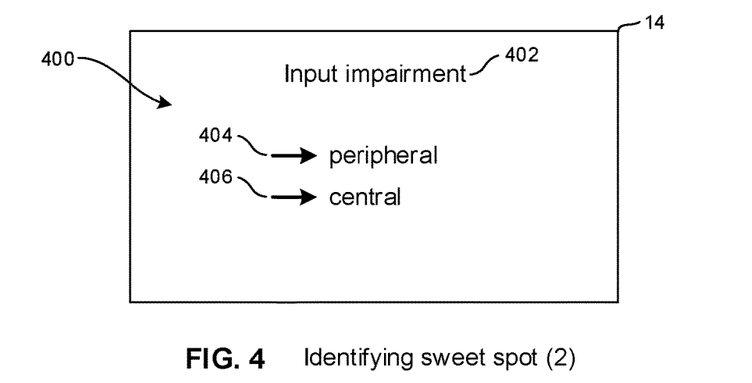
FIGS. 4 and 5 are screen shots of example interfaces for identifying the display "sweet spot" for the visually-impaired viewer, according to respective second and third embodiments.

FIG. 4 shows an alternate method for identifying the sweet spot at block 200. A user interface (UI) 400 may be presented on the display 14 (additionally or alternatively, may be spoken using the speakers 16) with a prompt 404 for a viewer to indicate an impairment. In the example shown, a first selector 404 may be selected to indicate peripheral vision impairment, as in glaucoma (in which case the sweet spot would be the center of the display), while a second selector 406 may be selected to indicate central vision impairment, as in macular degeneration (in which case the sweet spot would be the left and/or right periphery of the display). Similar visible or audible indicators may be presented for a user to speak his or her impairment.

Figure 5:
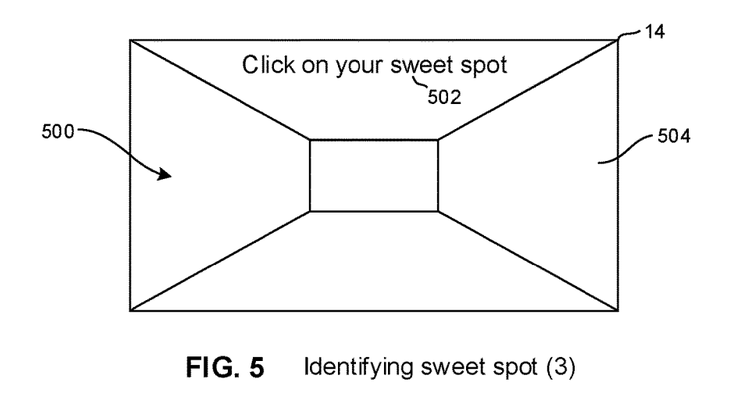

FIG. 5 shows yet another method for identifying the sweet spot at block 200. A UI 500 may be presented on the display 14 (additionally or alternatively, may be spoken using the speakers 16) with a prompt 502 for a viewer to select his or her sweet spot. The prompt may be visible as shown or audible. For visible entry, the UI may be lined with multiple regions 504 as shown, and a viewer need simply operate a remote control or touch screen to move a screen cursor over the preferred area and select the area to define the sweet spot. For audible entry, a user need only speak the region of the display desired, e.g., "left side" or "center". FIG. 5 may be overlaid on video for dynamic selection of the sweet spot by the user and may be invoked from a settings menu.

Figure 6:
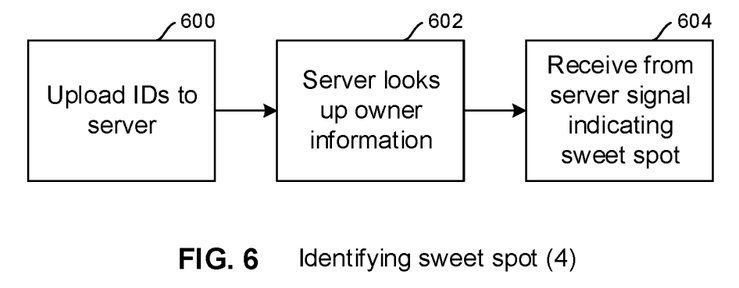
FIG. 6 is a flow chart of example logic for identifying the display "sweet spot" for the visually-impaired viewer, according to a fourth embodiment.

FIG. 6 shows yet another method for identifying the sweet spot at block 200. At block 600 one or more IDs are uploaded to the server 80. For example, the user's ID as input by the user or obtained from face recognition using images from the camera 32 may be uploaded, and/or the ID (e.g., model number or serial number) of the AVDD may be uploaded. The server, using the ID(s) at block 602, looks up personal information associated with the IDs, for example with the user ID or with a user profile associated with the device ID, with the personal information indicating either a specific malady or the sweet spot associated with the malady. The AVDD 12 receives back from the server at block 604 a signal useful for indicating the sweet spot.

Figure 7:
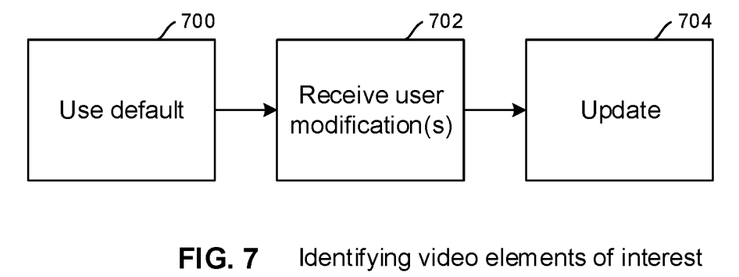
FIG. 7 is a flow chart of example logic for identifying (defining) video elements of interest to be moved to the sweet spot and magnified.

FIG. 7 shows an example logic flow of identifying video items of interest in a video to magnify and/or move those items according to description below. A default set of video items of interest may be identified at block 700. The default set may include video object types, for example, someone speaking, an object moving whose motion vectors satisfy a speed threshold, an object moving in a particular back background such as a vehicle coming up a valley, etc.

At block 702 user modifications, such as additions and deletions, to the default set may be received. The set of video items of interest is then updated according to the user modifications at block 704.

Figure 8:
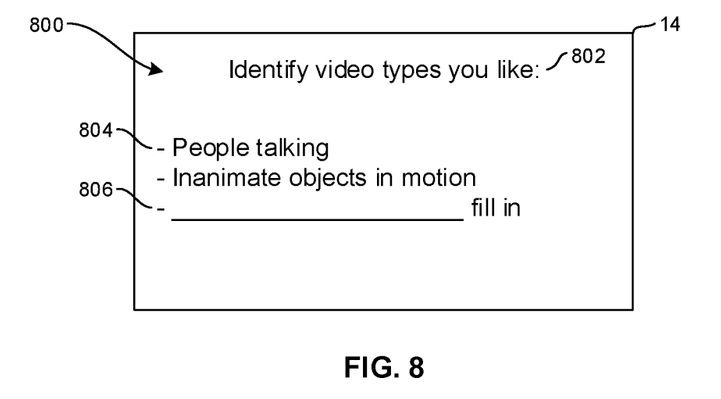
FIG. 8 is an example screen shot of an interface related to FIG. 7.

FIG. 8 illustrates an example user interface (UI) 800 that may be presented, e.g., on the display 14 of the AVDD 12. The UI 800 may also or alternatively be presented audibly on the speakers 16. The UI 800 may be presented alternatively or in addition on another device, such as the CE device 44.

The UI 800 may include a prompt 802 to the user to identify particular video items of interest the user prefers. Various predefined options 804 may be presented and may be selected to add them to the default set discussed above. Also, a field 806 may be provided to enable the user to type in (using, e.g., a keypad such as any of those described above) or speak (using, e.g., a microphone such as any of those described above) a video object type that may not appear in the predefined list of options 804. Toggling a selection may remove it from the set of video items of interest.

For ease of description the discussion below focuses on visually magnifying video items of interest, it being understood that for visually impaired people, sound associated with video items of interest may be amplified above the current volume setting of the AVDD.

Figure 9:
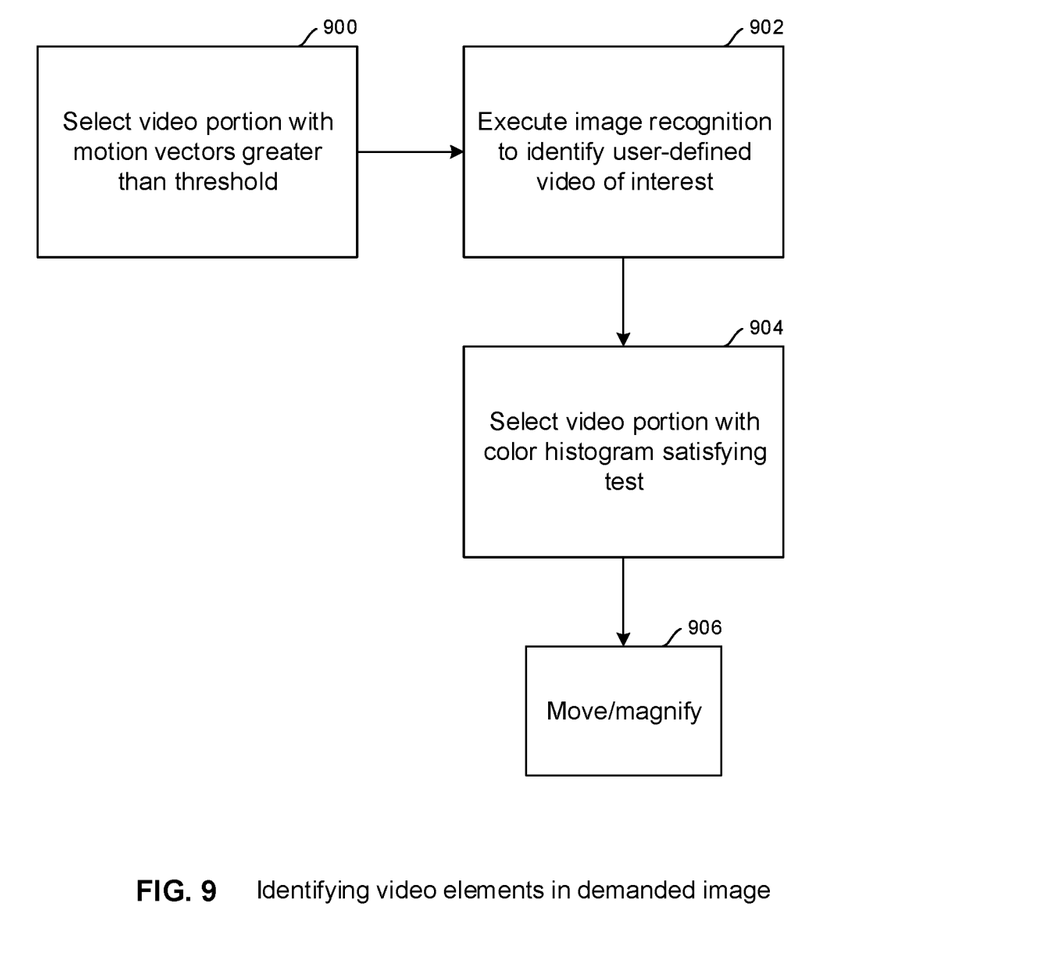
FIG. 9 is a flow chart of example logic for identifying predefined video elements of interest in a demanded video stream.

Once video items of interest are defined, the logic of FIG. 9 may be executed. It is to be understood that in executing logic herein, it may be assumed that the viewer will sit a predetermined proper distance from the AVDD to make the magnified/moved image fit in what can be seen without requiring the viewer to move his head left to right or up and down.

In the example of FIG. 9, at block 900 the processor of the AVDD 12 or other suitable processor communicating with the AVDD 12 selects a portion of a video frame or frames less than 100% of the frame (but greater than zero) in which motion vectors associated with the portion in I-macroblocks of the video satisfy a threshold, typically by meeting or exceeding a magnitude threshold. In other words, block 900 assumes that a video element of interest is one that is moving relatively quickly in the video.

In addition, or alternatively, image recognition may be executed on the video at block 902 to identify objects in the list of video elements of interest discussed above, including user-defined objects of interest. Yet again, at block 904 in addition or alternatively to the selections at blocks 900 and 902, a portion of a video frame or frames less than 100% of the frame but greater than zero is selected based on the portion having a color histogram satisfying a test, such as a histogram indicating a wide range of colors in the selected portion.

Proceeding to block 906 the items of interest are moved to the "sweet spot" from the video frame locations in which they were received, and if desired magnified in the new location in the "sweet spot". Equivalently, for hearing-impaired viewers the sound associated with video items of interest is amplified to a louder volume than the current volume setting of the AVDD.

Figure 10:
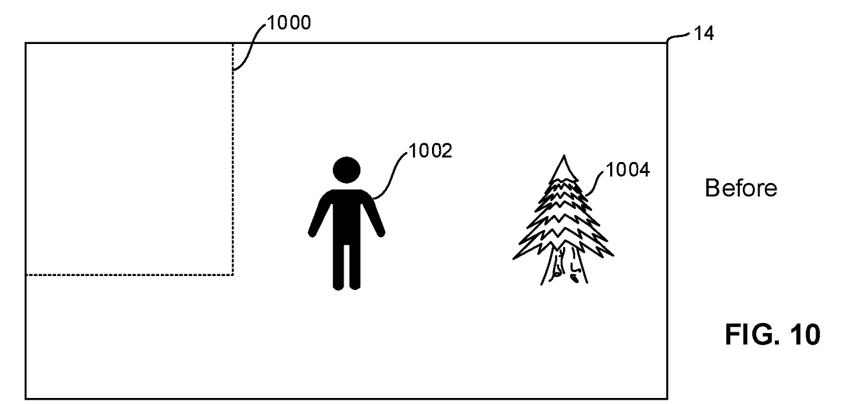
FIGS. 10 and 11 are before and after depictions, respectively, of video presentation illustrating the effects of moving a video element of interest to a first sweet spot appropriate for viewers suffering from a central viewing malady such as macular degeneration.
Figure 11:
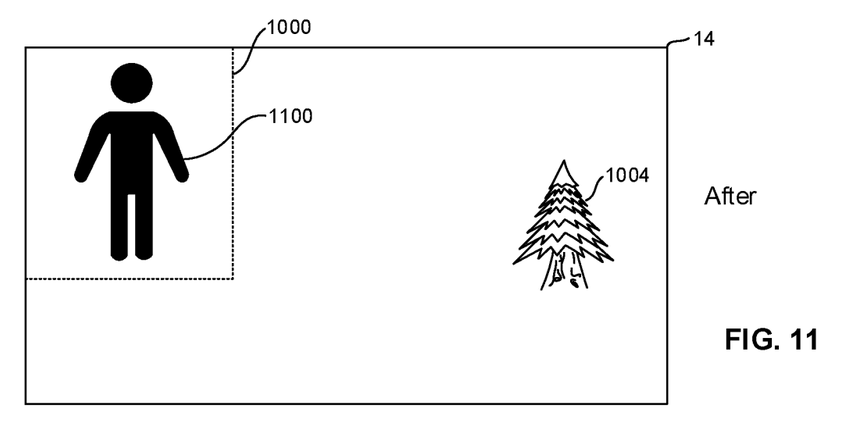

FIGS. 10 and 11 illustrate the above principles in connection with a sweet spot 1000 being defined on a periphery of the display as may be the case for a viewer with macular degeneration. An item of interest 1002 is received in original video outside the sweet spot, along with an object 1004 not of interest. After the logic of FIG. 2, the item of interest is moved to 1100 in the sweet spot, in the example shown, enlarged from its original size. The object 1004 not of interest remains in its original size and location in the video frame if desired.

Figure 12:
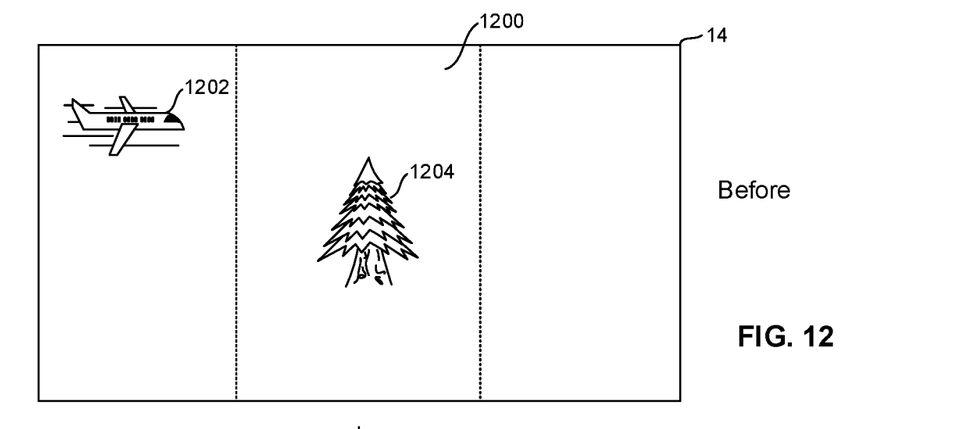
FIGS. 12 and 13 are before and after depictions, respectively, of video presentation illustrating the effects of moving a video element of interest to a second sweet spot appropriate for viewers suffering from a peripheral viewing malady such as glaucoma or retinitis pigmentosa.
Figure 13:
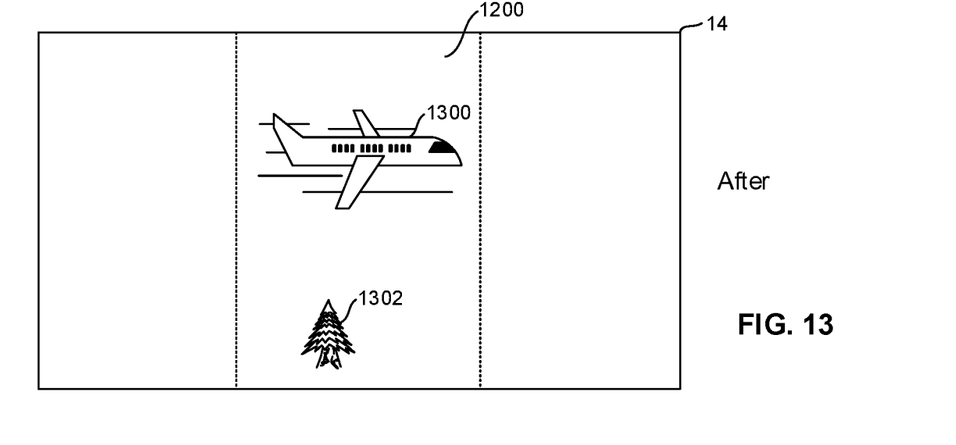

On the other hand, FIGS. 12 and 13 illustrate the above principles in connection with a sweet spot 1200 being defined in the center of the display as may be the case for a viewer with glaucoma. An item of interest 1202 is received in original video outside the sweet spot, along with an object 1204 not of interest. After the logic of FIG. 2, the item of interest is moved to 1300 in the sweet spot, in the example shown, enlarged from its original size. The object not of interest may be moved and reduced in size at 1302 so as not to interfere (e.g., overlap with) the item of interest 1302.

While particular techniques are herein shown and described in detail, it is to be understood that the subject matter which is encompassed by the present application is limited only by the claims.

What is claimed is:

1. A device comprising:
   at least one computer memory that is not a transitory signal and that comprises instructions executable by at least one processor to:
   identify at least one preferred region of a video display having plural regions, including at least one non-preferred region;
   identify at least one video item of interest (VII), the VII comprising a type of video object in at least one video frame for presentation on the video display;
   identify, in the at least one video frame for presentation on the video display, the VII in a frame location corresponding to the non-preferred region of the video display;
   present the VII in the preferred region of the video display instead of in the non-preferred region of the video display corresponding to the frame location in which the VII is received;
   wherein the VII is identified at least in part by:
   accessing a data store of VII, the VII in the data store comprising at least two video object types selected from: someone speaking, an object moving, an object in a particular background; and
   responsive to identifying at least a first VII in the data store as being at least one of someone speaking, an object moving, an object in a particular background, select the first VII and present the first VII in the preferred region of the video display.

2. The device of claim 1, wherein the instructions are executable to:
enlarge the VII relative to a size of the VII received in the video frame to render an enlarged VII which is presented in the preferred region in lieu of presenting the VII received in the video frame in the non-preferred region.

3. The device of claim 1, wherein the instructions are executable to identify the at least one preferred region of a video display at least in part by:
receiving an image of a viewer;
executing image recognition on the image to render a result;
using the result to access a database having information useful in identifying the preferred region based on the result of the image recognition.

4. The device of claim 1, wherein the instructions are executable to identify the at least one preferred region of a video display at least in part by:
receiving input from at least one user interface (UI) indicating a type of visual impairment; and
correlating the type of visual impairment to the preferred region, wherein the UI comprises:
an audible or visual prompt to indicate an impairment;
at least a first audible or visual selector selectable to indicate a first vision impairment;
at least a second selector audible or visual selectable to indicate a second vision impairment, the first vision impairment being a different from the second vision impairment.

5. The device of claim 4, wherein the first vision impairment is indicated by the UI as being a central vision impairment and the second vision impairment is identified by the UI as being a peripheral vision impairment.

6. The device of claim 1, wherein the instructions are executable to identify the at least one preferred region of a video display at least in part by:
receiving input from at least one user interface (UI) indicating, by a selection on a region of the display, the preferred region.

7. The device of claim 1, wherein the instructions are executable to identify the at least one preferred region of a video display at least in part by:
sending to at least one server at least one identification (ID), the ID including an ID of the video display and/or an ID of a person; and
receiving back from the server indication of the preferred region responsive to the ID.

8. The device of claim 1, wherein the instructions are executable to identify, in at least one video frame for presentation on the video display, the VII at least in part by:
selecting a portion of a video frame as the VII responsive to the portion being characterized by one or more motion vectors satisfying a first test.

9. The device of claim 1, wherein the instructions are executable to identify, in at least one video frame for presentation on the video display, the VII at least in part by:
executing image recognition on at least one video frame to identify a VII.

10. The device of claim 1, wherein the preferred region is at a center of the video display.

11. The device of claim 1, wherein the preferred region does not include a peripheral region of the video display.

12. The device of claim 1, wherein the instructions are executable to:
identify a distance from the video display at which a viewer is located; and
based at least in part on the distance, present the VII in the preferred region of the video display.

13. The device of claim 1, wherein the instructions are executable to:
identify, in at least one video frame for presentation on the video display, the VII at least in part by:
selecting a portion of a video frame as the VII responsive to the portion being characterized by having a color histogram indicating a range of colors in the portion.

14. A device comprising:
at least one computer memory that is not a transitory signal and that comprises instructions executable by at least one processor to:
identify at least one preferred region of a video display having plural regions, including at least one non-preferred region;
identify at least one video item of interest (VII), the VII comprising a type of video object in at least one video frame for presentation on the video display;
identify, in the at least one video frame for presentation on the video display, the VII in a frame location corresponding to the non-preferred region of the video display;
present the VII in the preferred region of the video display instead of in the non-preferred region of the video display corresponding to the frame location in which the VII is received;
wherein the instructions are executable to receive the identification of the at least one VII at least in part by:
receiving input from at least one user interface (UI) indicating at least one VII, wherein the UI comprises:
a prompt to identify VII;
a list of VII from which one or more VII may be selected, the list including VII comprising someone speaking, an object moving, an object in a particular background;
an entry element to receive input to identify a VII from someone speaking, an object moving, an object in a particular background.

15. A method, comprising:
identifying that a viewer of a video display has a peripheral visual impairment;
accessing a data store of default items of interest, the default items of interest comprising at least two video object types selected from: someone speaking, an object moving, an object in a particular background;
responsive to identifying that the viewer of the video display has a peripheral visual impairment, selecting a first one of the default items of interest on the basis that the first one of the default items of interest is one of: someone speaking, an object moving, an object in a particular background; and
presenting, in a central region of the video display, at least the first one of the default items of interest received in a peripheral region of a video frame.

16. A system comprising:
at least one video display;
at least one processor to control the video display; and
storage with instructions accessible to the processor to cause the processor to:
identify that a video item of interest received in a peripheral region in a video frame is to be presented in a central region of the video display;
responsive to identifying the video item of interest in a peripheral region in a video frame, present the video item of interest (VII) in the central region of the video display, wherein the VII comprises a video object type and the instructions are executable to receive an identification of the at least one VII at least in part by:
receiving input from at least one user interface (UI) indicating at least one VII, wherein the UI comprises:
a prompt to identify VII;
a list of VII from which one or more VII may be selected, the list including VII comprising someone speaking, an object moving, an object in a particular background;
an entry element to receive input to identify a VII from someone speaking, an object moving, an object in a particular background.

17. The system of claim 16, wherein the instructions are executable to:
enlarge the VII relative to a size of the VII received in the video frame to render an enlarged VII which is presented in the central region in lieu of presenting the VII received in the video frame in the peripheral region.

18. The system of claim 16, wherein the instructions are executable to receive an identification of the at least one VII at least in part by:
accessing a data store of default VII, the default VII comprising at least two video object types selected from: someone speaking, an object moving, an object in a particular background.

19. The system of claim 16, wherein the instructions are executable to identify, in at least one video frame for presentation on the video display, the VII at least in part by:
selecting a portion of a video frame as the VII responsive to the portion being characterized by one or more motion vectors satisfying a first test.

20. The system of claim 16, wherein the instructions are executable to identify, in at least one video frame for presentation on the video display, the VII at least in part by:
executing image recognition on at least one video frame to identify a VII.

21. The system of claim 16, wherein the instructions are executable to:
identify a distance from the video display at which a viewer is located; and
based at least in part on the distance and responsive to identifying the video item of interest in a peripheral region in a video frame, present the video item of interest (VII) in the central region of the video display.

\* \* \* \* \*